United States Patent [19]

Needham

[11] Patent Number: 5,571,435

[45] Date of Patent: Nov. 5, 1996

[54] WELDING ROD HAVING PARALLEL ELECTRICAL PATHWAYS

[75] Inventor: Donald G. Needham, Ramona, Okla.

[73] Assignee: Neeco, Inc., Ramona, Okla.

[21] Appl. No.: 428,468

[22] Filed: Apr. 26, 1995

[51] Int. Cl.[6] .............................. H05B 3/44; B27G 11/02
[52] U.S. Cl. ........................ 219/544; 219/547; 219/528; 219/535; 338/214; 156/379.7
[58] Field of Search ..................................... 219/544, 547, 219/528, 535, 549; 338/214; 156/379.7, 499

[56] References Cited

U.S. PATENT DOCUMENTS

| | | | |
|---|---|---|---|
| 2,983,386 | 5/1961 | Resnick | 154/42 |
| 3,378,672 | 4/1968 | Blumenkranz | 219/200 |
| 3,407,703 | 7/1962 | Aske | 156/273.9 |
| 4,385,957 | 5/1983 | Wackerle et al. | 219/544 |
| 5,225,025 | 6/1993 | Lambling et al. | 156/379.7 |
| 5,389,184 | 2/1995 | Jacaruso et al. | 219/544 |
| 5,407,520 | 4/1995 | Butts et al. | 156/379.7 |

FOREIGN PATENT DOCUMENTS

| | | |
|---|---|---|
| 1235872 | 5/1988 | Canada . |
| 1325092 | 12/1993 | Canada . |
| 1121850 | 11/1965 | United Kingdom .................. 219/535 |
| WO94/14599 | 6/1994 | WIPO .................................. 219/544 |

*Primary Examiner*—Teresa J. Walberg
*Assistant Examiner*—Karl Easthom
*Attorney, Agent, or Firm*—Timothy R. Kroboth

[57] ABSTRACT

An improved welding rod for joining plastic materials is provided. The welding rod includes a core of electrically resistive fiber, and a winding of electrically resistive fiber separated by a plastic barrier layer. Also provided is a method for joining plastic materials using the welding rod.

15 Claims, 1 Drawing Sheet

WELDING ROD HAVING PARALLEL ELECTRICAL PATHWAYS

FIELD OF THE INVENTION

This invention relates to an improved article of manufacture for joining two or more plastic materials by welding.

BACKGROUND OF THE INVENTION

Welding rods are known for joining plastic materials by welding. Such thermoplastic materials include polyethylene and the like. An illustrative welding rod type is described in Canadian Patent No. 1,235,872 and in Reissued Canadian Patent No. 1,325,092, and consists of a solid core of thermoplastic material wrapped with a helical winding of nichrome or stainless steel wire through which current is applied to soften and melt the plastic core and the contacting portions of the plastic members to be welded. These patents disclose that other forms of resistive elements such as coatings of suitable resistivity may be used, provided that the coating is compatible with the thermoplastic core.

However, it has been found that such a welding rod is not altogether satisfactory. For instance, the rod melts on the outside and flows away before softening adequately to allow mating surfaces of the plastic members to be pressed into contact with one another. Also, more rapid softening of the rod would be beneficial. In addition, the metal wire is sometimes undesirable in the welded product. Therefore, there is a need for an improved welding rod and welding method based thereon.

SUMMARY OF THE INVENTION

In accordance with the present invention, there is provided an improved welding rod which beneficially includes a core of electrically resistive fiber surrounded by a meltable layer of a first plastic material. In a preferred embodiment, a fiber bundle forms the fiber core. Wrapping the meltable layer is a winding of electrically resistive fiber, which may be the same or different fiber than that of the fiber core. The fiber core and fiber winding are electrically separate, resistive elements for conduction of voltage and generation of current sufficient to produce adequate heat. The meltable layer of plastic material beneficially serves as an insulator between these parallel electrical pathways. Advantageously encasing the fiber winding is a meltable coating or sheath of plastic material which may be the same as or different than the first plastic material. As shown in FIG. 2, the meltable layer is of greater cross-sectional thickness then the meltable coating. In a beneficial application, the plastic material of the meltable coating is different than the first plastic material, for serving as a tie-layer.

In a method in accordance with the present invention, the welding rod is beneficially positioned into contact with the plastic members to be welded, and electrical current is applied to both the fiber core and the fiber winding of the welding rod under conditions suitable for softening and melting the rod and the contacting portions of the plastic members. Typically, it is beneficial to apply pressure to press together the welding rod and the plastic members so as to provide a unified structure upon cooling.

In the detailed description of the invention that follows, there is essentially described only a preferred embodiment of this invention, simply by way of illustration of the best mode contemplated of carrying out the invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention, and which will be understood to be diagrammatic.

DETAILED DESCRIPTION OF THE INVENTION

Figure 1:
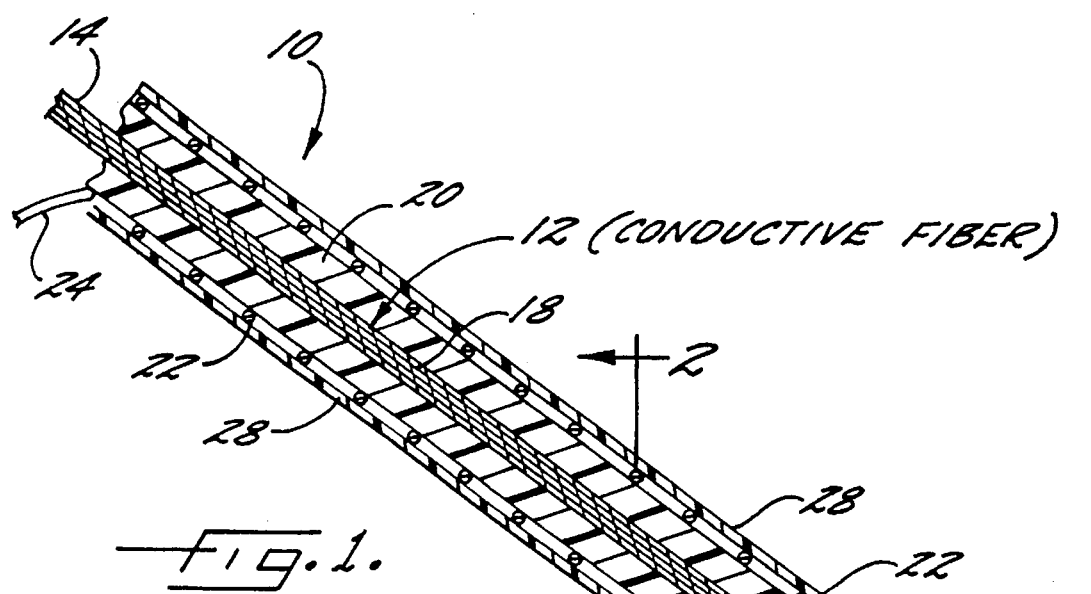
FIG. 1 is a cross-sectional view along the axis of a preferred welding rod in accordance with the present invention.
Figure 2:
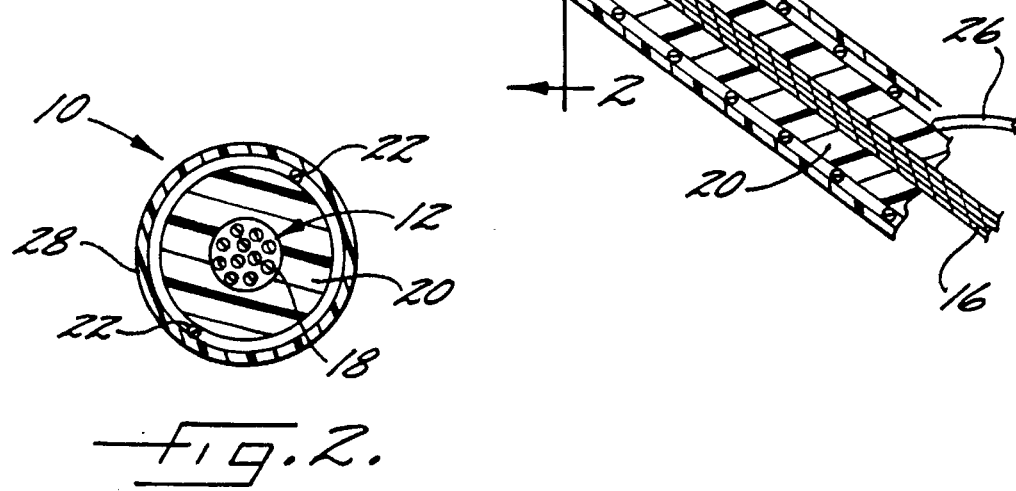
FIG. 2 is an enlarged cross-sectional view taken substantially along line 2—2 of FIG. 1.

Referring to FIGS. 1 and 2 of the drawing, a welding rod 10 in accordance with the present invention, includes an electrically resistive, fiber bundle 12 which forms the core of the welding rod. Preferably for structural reinforcement of the welded structure, carbon fiber is used; however, other electrically resistive fibers may alternatively be used. Beneficially, in accordance with the invention, non-metallic filaments are used. Ends 14, 16 of the fiber bundle are connected to a suitable electric source.

The fiber bundle may vary in the number of monofilaments 18. Useful commercially available, carbon fiber roving for use as the welding rod core may, for example, consist of about 50 to 200 or more monofilaments. Relatively more monofilaments will beneficially increase the amperage carrying capacity of the fiber bundle. Relatively greater monofilament diameter for a given number of monofilaments will advantageously increase the structural reinforcing action of the fiber bundle. Typical useful monofilaments may be combined into a bundle or roving having a diameter of about 50 to 60 thousands of an inch.

Exterior to and surrounding the fiber core, is a rod 20 of plastic material. Melting of the plastic material adjacent the fiber core during welding, beneficially produces monofilament encapsulation, which enhances the structural reinforcement provided by the fiber bundle to the unified, welded product.

As shown in FIG. 2, rod 20 may be cylindrical. However, other shapes may be used. For instance, the rod may be rectangular. Conveniently, the fiber core/rod structure is provided by coating the fiber core with the plastic material of rod 20.

A variety of materials may be used as the plastic material of rod 20. Typically, the plastic material will be a thermoplastic material, and will be selected for compatibility with the plastic members to be welded. Illustrative thermoplastic materials for rod 20 include polyethylene, ethylene vinyl acetate and polypropylene. Linear low density, medium density and high density polyethylenes are useful. High molecular weight resins may be used to shield the fiber core, and to build up thickness between the plastic surfaces being welded together. Crosslinkable polyethylenes will advantageously provide a tough weld.

As mentioned earlier, rod 20 is wrapped with electrically resistive fiber 22; accordingly, to prevent shorting between the electrically resistive core element and the electrically resistive winding, rod 20 serves an insulating or barrier function. Thus, rod 20 may not contain a sufficient loading of electrically conductive inclusions such as carbon to be electrically conductive, and must be of sufficient thickness along its length to prevent the shorting until the desired softening has taken place.

As shown in FIG. 1, the fiber winding is suitably helical, and as may be understood, ends 24, 26 of the fiber winding are connected to a suitable electric source. As in the case of the resistive core element, the fiber winding is preferably carbon fiber; however, other electrically resistive fibers may be used. As may also be understood, plastic rod 20 may be wound with a plurality of electrically resistive fibers, and the ends of the windings may be joined in parallel for connection to a voltage source.

The diameter of fiber to be used, the spacing between the turns, and the number of fibers for winding on plastic rod 20, may vary. Useful monofilaments may be collected or combined together to form a bundle or roving for winding on the plastic rod and having a diameter of about 50 to 60 thousands of an inch.

Surrounding helical winding 22 and plastic rod 20 is a coating or sleeve or sheath 28 of plastic material. Sheath 28 advantageously protects the integrity of the fiber winding, and in addition, when more than one welding rod is used, prevents shorting of fiber windings of contacting welding rods. Conveniently, sheath 28 is provided by coating the fiber winding and rod with a suitable plastic material.

As in the case of the plastic material of rod 20, a variety of plastic materials may be used as the sheath, and typically the plastic material will be a thermoplastic material selected for compatibility with the plastic members to be welded. The sheath material may be the same as or different than the material of rod 20, which has been previously illustrated.

In a useful application in which the sheath material is different than the material of rod 20, the sheath material may also be chosen to function as a tie layer between an otherwise incompatible plastic material of rod 20 and the plastic members to be welded. In this case, the sheath material may be lower melting than the plastic material of rod 20, which may be a high molecular weight resin for building up thickness. A useful plastic to serve as a tie layer will depend upon the particular plastics of rod 20 and the plastic members to be welded; and reference is here made to tie layer prior art for further details of incompatible plastic layers and conventional tie layers useful for joining such layers.

Figure 3:
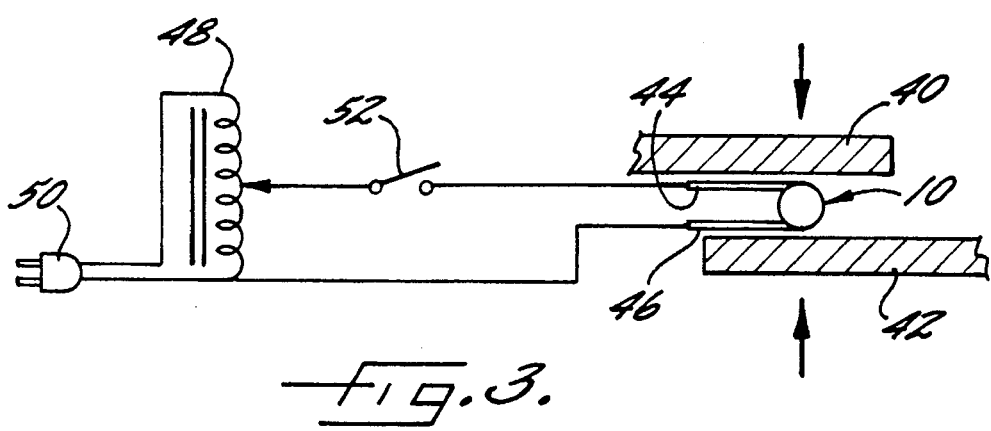
FIG. 3 illustrates the electrical connections for making a lap weld using the welding rod of FIG. 1.

With reference to FIG. 3, to form a lap weld, welding rod 10 is positioned between and beneficially in touching contact with plastic members 40, 42 to be welded, ends of the core resistive element and the resistive winding element are conveniently joined in parallel to form ends 44, 46, and ends 44, 46 are suitably connected to a conventional transformer 48. Transformer 48 is connected to a source of electrical power by plug 50, and a conventional switch 52 is provided in the electrical circuit. By closing switch 52, electrical current is applied to resistive elements 12, 20. As indicated in FIG. 3, the members to be welded are typically beneficially pressed together. Current is passed through the resistive elements for a sufficient period of time and at a sufficient amperage to cause welding rod 10 and the contacting portions of plastic members 40, 42, to soften and melt. As may be understood, the time and amperage suitable for a particular application will depend upon the softening or melting temperatures of the plastics being softened or melted, and upon the desired speed of operation. In a manner similar to that described, a butt weld may be formed.

Useful applications of a welding rod in accordance with the present invention, include welding together polyethylene members, such as linear low density polyethylene members, low melt index medium density polyethylene members, and crosslinkable polyethylene members. Benefits of the welding rod include adequate softening of the inside of rod 20 to permit a joint to be pressed together, without excessive flow and loss of molten plastic resulting from melting of the outside of the rod. In addition, more rapid softening and melting of rod 20 occurs as a result of the electrically resistive, fiber core. More particularly, the use of both an electrically resistive element within rod 20 and an electrically resistive element exterior to rod 20, provides these benefits. Furthermore, encapsulation of fiber monofilaments provides enhanced strength to a welded product. A further benefit is that no metal wire need be used.

The present invention may be carried out with other modifications than those mentioned without departing from the spirit or essential attributes thereof; and accordingly, reference should be made to the appended claims, rather than to the foregoing specification as indicating the scope of the invention.

I claim:

1. A welding rod comprising a core of electrically resistive fiber surrounded by a meltable layer of a first plastic material; a winding of electrically resistive fiber wrapping said meltable layer, the fiber core and the fiber winding being electrically separated by said meltable layer, which also serves as an insulator; and a meltable tie-layer of a second plastic material over the fiber winding, said second plastic material of said tie-layer being different than said first plastic material which is incompatible with plastic members to be welded, and said second plastic material being compatible with said plastic members to be welded for joining the incompatible first plastic material to said plastic members to be welded.

2. The welding rod of claim 1, wherein said fiber of said fiber core and said fiber of said fiber winding are the same fiber.

3. The welding rod of claim 1, wherein said fiber core is carbon fiber, and said fiber winding is carbon fiber.

4. The welding rod of claim 1, wherein said first plastic material is a thermoplastic selected from the group consisting of polyethylene, ethylene vinyl acetate and polypropylene.

5. The welding rod of claim 1, wherein said first plastic material is selected from the group consisting of linear low density polyethylene, medium density polyethylene, high density polyethylene, and crosslinkable polyethylene.

6. The welding rod of claim 1, wherein said welding rod is of circular cross-section.

7. A welding rod comprising a core of an electrically resistive, non-metallic fiber bundle surrounded by a layer of a first plastic material meltable for the joining of plastic members to be welded; a winding of electrically resistive, non-metallic fiber wrapping said meltable layer, the resistive fiber bundle and the resistive fiber winding being parallel electrical pathways electrically separated by said meltable layer of plastic material, which also serves as an insulator; and a meltable coating of a second plastic material over the fiber winding, wherein said meltable layer is of greater cross-sectional thickness than said meltable coating, and said second plastic material is the same as or different than said first plastic material.

8. The welding rod of claim 7, wherein said fiber of said fiber core and said fiber of said fiber winding are the same non-metallic fiber.

9. The welding rod of claim 8, wherein said fiber core is carbon fiber, and said fiber winding is carbon fiber.

10. The welding rod of claim 7, wherein said first plastic material is a thermoplastic selected from the group consisting of polyethylene, ethylene vinyl acetate and polypropylene.

11. The welding rod of claim 7, wherein said first plastic material is selected from the group consisting of linear low density polyethylene, medium density polyethylene, high density polyethylene, and cross-linkable polyethylene.

12. The welding rod of claim 7, wherein said welding rod is of circular cross-section.

13. The welding rod of claim 7, wherein said winding is wrapped in a helical pattern.

14. A method for joining plastic members, said method comprising positioning the welding rod of claim 7 into contact with said plastic members, connecting an end of said resistive fiber bundle and an end of said resistive fiber winding to an electrical voltage source, and applying an electrical current to said resistive fiber bundle and said resistive fiber winding under suitable conditions to cause said plastic members and said welding rod to be joined together upon subsequent cooling.

15. The method of claim 14, further comprising pressing said welding rod and said plastic members together while applying said electrical current whereby monofilament encapsulation of filaments of said fiber bundle by said first plastic material is produced.

\* \* \* \* \*